(12) United States Patent
Yu et al.

(10) Patent No.: US 9,575,915 B2
(45) Date of Patent: Feb. 21, 2017

(54) DATA MIGRATION METHOD AND APPARATUS

(71) Applicant: Huawei Technologies Co., Ltd., Shenzhen, Guangdong (CN)

(72) Inventors: Hongliang Yu, Xi'an (CN); Linli Zhang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 519 days.

(21) Appl. No.: 14/093,128

(22) Filed: Nov. 29, 2013

(65) Prior Publication Data
US 2014/0156886 A1    Jun. 5, 2014

(30) Foreign Application Priority Data
Nov. 30, 2012   (CN) .......................... 2012 1 0504123

(51) Int. Cl.
| | |
|---|---|
| G06F 13/00 | (2006.01) |
| G06F 13/36 | (2006.01) |
| H04L 12/24 | (2006.01) |
| G06F 13/40 | (2006.01) |
| G06F 12/06 | (2006.01) |
| G06F 9/44 | (2006.01) |
| G06F 13/38 | (2006.01) |
| G06F 11/20 | (2006.01) |

(52) U.S. Cl.
CPC .......... *G06F 13/36* (2013.01); *H04L 41/0846* (2013.01); *H04L 41/0869* (2013.01); *G06F 9/4411* (2013.01); *G06F 11/2005* (2013.01); *G06F 12/0661* (2013.01); *G06F 13/385* (2013.01); *G06F 13/409* (2013.01); *G06F 13/4072* (2013.01)

(58) Field of Classification Search
None
See application file for complete search history.

(56) References Cited

U.S. PATENT DOCUMENTS

| | | | | |
|---|---|---|---|---|
| 6,112,271 A | * | 8/2000 | Lanus | ................... G06F 13/409 |
| | | | | 710/301 |
| 2012/0324134 A1 | * | 12/2012 | Tsuji | ....................... H04L 25/02 |
| | | | | 710/301 |

FOREIGN PATENT DOCUMENTS

| | | |
|---|---|---|
| CN | 1741404 A | 3/2006 |
| CN | 101035326 A | 9/2007 |
| CN | 102546238 A | 7/2012 |

* cited by examiner

*Primary Examiner* — Henry Tsai
*Assistant Examiner* — Aurangzeb Hassan
(74) *Attorney, Agent, or Firm* — Leydig, Voit & Mayer, Ltd.

(57) ABSTRACT

The present invention provides a data migration method and apparatus, where the method includes: after a second control board is inserted into a second control board slot, receiving, by a first control board, type information from the second control board, and determining whether the type information of the second control board and type information of the first control board are the same; and when determining that the type information of the second control board and the type information of the first control board are different, sending, by the first control board, configuration data stored by the first control board itself to the second control board, so that the second control board utilizes the configuration data to perform a configuration.

5 Claims, 4 Drawing Sheets

---

After a second control board is inserted into the second control board slot, the first control board receives type information from the second control board  — 101

Determine whether the type information of the second control board and type information of the first control board are the same; and when determining that the type information of the second control board and the type information of the first control board are different, the first control board sends configuration data stored by the first control board itself to the second control board, so that the second control board utilizes the configuration data to perform a configuration  — 102

DATA MIGRATION METHOD AND APPARATUS

CROSS-REFERENCE TO RELATED APPLICATION

This application claims priority to Chinese Patent Application No. 201210504123.X, filed on Nov. 30, 2012, which is hereby incorporated by reference in its entirety.

TECHNICAL FIELD

The present invention relates to communication technologies, and in particular, to a data migration method and apparatus.

BACKGROUND

In a communication device of each site in a communication network layout, a control board used to be responsible for service processing is generally disposed, and a communication device with a large user capacity is generally configured with two control boards: an active one and a standby one. Due to reasons such as one for satisfying demands for continuously developed service processing capabilities, new control boards are continuously developed, such as a control board with a higher processing capability, and an old control board needs to be replaced with a new control board, namely, control board upgrading is performed, so as to improve a processing capability of the communication device, and satisfy service demands.

A key for replacement between a new control board and an old control board is to migrate configuration data on an old control board of an existing network to a new control board, and the prior art adopts the following manner: Before upgrading, a shelf completely the same as that of a communication device of an existing site is additionally prepared in a lab (if the shelves do not match with each other, data conversion may fail), and the new control board is inserted into the shelf and started; first, an application is made to an operations support system (Operations support system, OSS for short) of an operator to stop service provisioning, so as to avoid data loss caused by configuration data alteration once more in a control board replacement procedure. Then, remote login is made to the site of the existing network, configuration data corresponding to the old control board to be replaced is exported, the data is imported into the new control board and data conversion is performed. The data conversion is to convert a data format of the data of the old control board into that matching with a type of the new control board, and specifically, a manner of activating a configuration file or internally disposing a database upgrading tool may be adopted. After the data conversion is completed, the new control board is unplugged from the shelf, a site and a communication device which correspond to the new control board are recorded, an operator takes the new control board to the site of the existing network to find the corresponding communication device, and unplugs the old control board in the device, and then inserts the new control board, and the replacement procedure is completed after the new control board is started.

The manner of replacing an old control board with a new control board has the following problems.

First, configuration data import of the new control board can only be completed in the lab in advance, and the shelf has to be additionally prepared; after the data is imported, the operator takes the new control board to the site to perform replacement, and configuration data export, import and conversion work are all executed through manual control, so control board replacement efficiency is low, and a manpower cost is high.

In addition, from the time of beginning to export the configuration data of the old control board to the time of completing the control board replacement, where the time for the operator to hurry to the site of the existing network is included, it is not allowed to provision a new service in the entire procedure, so as to prevent inconsistency between the configuration data of the new control board and that of the old control board; furthermore, sites of the existing network are generally not distributed in a concentrated manner, so that it is caused that no service can be provisioned in several hours or even in a longer time, thereby impacting service operating of the existing network greatly.

Furthermore, after the configuration data is imported into the new control board in the lab, each new control board has to be tagged with a specific site and a specific communication device which correspond to the each new control board, and the operator finds the corresponding device according to the tag to replace the old control board with the new control board; if control boards of a plurality of communication devices are replaced simultaneously, manual seeking according to a tag easily errs, and a situation of an error of non-corresponding insertion of a control board may occur.

SUMMARY

The present invention provides a data migration method and apparatus, so as to improve control board replacement efficiency, reduce an influence on a service in a replacement procedure, and reduce a cost and an error ratio of the replacement procedure.

In a first aspect, a data migration method of a control board in a communication device is provided, where the communication device includes a first control board slot and a second control board slot, the first control board slot is inserted with a first control board, and the method includes:

after a second control board is inserted into the second control board slot, receiving, by the first control board, type information from the second control board, and determining whether the type information of the second control board and type information of the first control board are the same; and when determining that the type information of the second control board and the type information of the first control board are different, sending, by the first control board, configuration data stored by the first control board itself to the second control board, so that the second control board utilizes the configuration data to perform a configuration.

In combination with the first aspect, in a first possible implementation manner, before the receiving, by the first control board, type information from the second control board, the method further includes: receiving, by the first control board, a communication link establishment request sent by the second control board, and establishing a communication link with the second control board according to the communication link establishment request.

In combination with the first aspect or the first possible implementation manner of the first aspect, in a second possible implementation manner, before the second control board utilizes the configuration data to perform the configuration, the method further includes: converting, by the second control board, the configuration data, so that the configuration data matches with the second control board.

In combination with the second possible implementation manner of the first aspect, in a third possible implementation manner, after the converting, by the second control board, the configuration data, the method further includes: prompting, through an indicator light, that data conversion is completed.

In a second aspect, a communication device is provided, where the communication device includes a first control board slot and a second control board slot, the first control board slot is inserted with a first control board, and the first control board is configured to, after a second control board is inserted into the second control board slot, receive type information from the second control board, and determine whether the type information of the second control board and type information of the first control board are the same; and, when determining that the type information of the second control board and the type information of the first control board are different, send configuration data stored by the first control board itself to the second control board, so that the second control board utilizes the configuration data to perform a configuration.

In combination with the second aspect, in a first possible implementation manner, the communication device further includes: the second control board, where the second control board is inserted into the second control board slot; and the first control board is further configured to, before receiving the type information from the second control board, receive a communication link establishment request sent by the second control board, and establish a communication link with the second control board according to the communication link establishment request.

In combination with the first possible implementation manner of the second aspect, in a second possible implementation manner, the second control board is configured to, before utilizing the configuration data received from the first control board to perform the configuration, convert the configuration data, so that the configuration data matches with the second control board.

In combination with the first possible implementation manner or the second possible implementation manner of the second aspect, in a third possible implementation manner, the second control board is further configured to, after the first control board is unplugged from the first control board slot, use the configuration data to start, thereby taking over the communication device.

In combination with the first possible implementation manner or the second possible implementation manner of the second aspect, in a fourth possible implementation manner, the second control board is further configured to, when the first control board slot is inserted with a new control board, send configuration data stored by the second control board itself to the new control board.

In a third aspect, a control board is provided, where the control board is configured to be inserted into a first control board slot of a communication device, the communication device is further disposed with a second control board slot, and the control board includes: a receiving unit, a comparing unit and a sending unit;

the receiving unit is configured to, after a second control board is inserted into the second control board slot, receive type information from the second control board; and the comparing unit is configured to determine whether type information of the current control board and the type information of the second control board are the same; and when a determining result is that the type information of the current control board and the type information of the second control board are different, send, through the sending unit to the second control board, configuration data stored by the current control board itself, so that the second control board utilizes the configuration data to perform a configuration.

Technical effects of the control board and the data migration method of the control board provided by the present invention are: Improvement of control board replacement efficiency, reduction of an influence on a service in a replacement procedure, and reduction of a cost and an error ratio of the replacement procedure are simultaneously implemented, which are specifically as follows:

First, after a second control board as a new control board is inserted into a second control board slot, a first control board as an old control board can automatically transmit configuration data when detecting that type information is different, and the first control board and the second control board are located in a same communication device, so that configuration data import does not need to be performed anymore in a lab additionally, no shelf needs to be prepared additionally, and the new control board and the old control board are inserted in a mixed manner directly at a site of an existing network, so as to leave out preparation work in the lab, and improve the control board replacement efficiency; furthermore, the configuration data is automatically transmitted by the first control board to the second control board when it is detected that type information of the two control boards is different, and no manual operation is required, so as to further improve the control board replacement efficiency, and reduce a manpower cost.

In addition, the new control board may be directly taken to the site of the existing network and be inserted with the old control board in a mixed manner, and then work such as data import begins, so during the time when an operator hurries to the site of the existing network, it is not required to stop service provisioning, thereby reducing the time during which a service is influenced.

Furthermore, after the new control board is taken to the site of the existing network and inserted with the old control board in a mixed manner, work such as data import begins, so it is equivalent to that the new control board is first inserted into the device and then data is configured; therefore, it is no longer required to put a tag on the new control board, and it is not required to seek the corresponding device according to the tag, which avoid a situation that manual seeking according to a tag errs, and reduce the error ratio of the replacement procedure.

DESCRIPTION OF EMBODIMENTS

Embodiment 1

Figure 1:
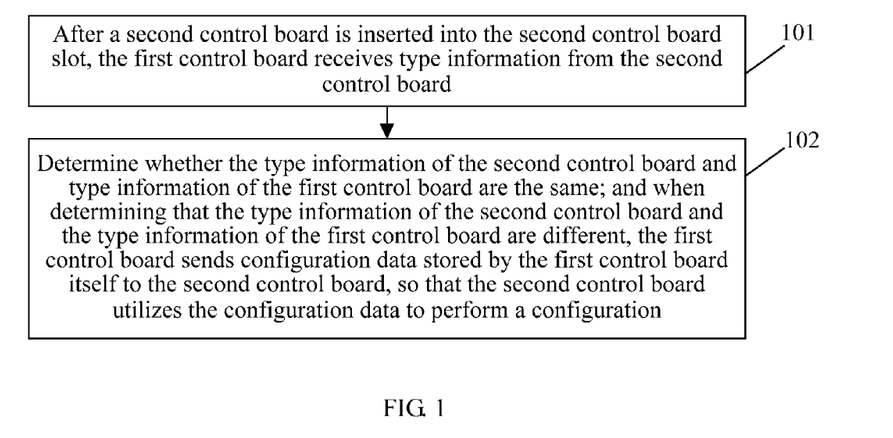
FIG. 1 is a schematic flow chart of an embodiment of a data migration method of a control board in a communication device according to the present invention.

FIG. 1 is a schematic flow chart of an embodiment of a data migration method of a control board in a communication device according to the present invention. The method is executed by a first control board in a certain communication device, the communication device includes a first control board slot and a second control board slot, and the first control board is inserted into the first control board slot. As shown in FIG. 1, the method may include:

101: After a second control board is inserted into the second control board slot, the first control board receives type information from the second control board.

The first control board is an old control board inserted into the first control board slot, an execution subject of this embodiment is also the first control board, namely, in this embodiment, the data migration method of a control board of the present invention is described by taking the old control board as the execution subject. For example, the second control board is a control board developed to have a higher service processing capability compared with that of the first control board.

In this embodiment, the first control board and the second control board are located in a shelf of a same communication device. For example, a communication device with a large user capacity is generally provided with two control board slots, one of which is an active control board slot position, and the other of which is a standby control board slot position. In this embodiment, when the old control board is replaced with a new control board, a mixed insertion manner is adopted, namely, the first control board (the old control board) and the second control board (the new control board) are inserted into the shelf of the same communication device. For example, the old control board is originally located in the active control board slot position of the shelf. In this embodiment, a standby old control board in the original standby control board slot position is unplugged, and the second control board is inserted into the standby control board slot position, so the first control board and the second control board are run in a mixed insertion manner, namely, two different types of control boards: the new control board and the old control board, are run in the same shelf. Definitely, during specific implementation, an old control board of the active control board slot position may also be unplugged, so that the second control board and the standby old control board are run in a mixed insertion manner; in this case, the standby old control board is upgraded to an active old control board, and the standby old control board likewise executes the data migration method in this embodiment. That is, the second control board slot into which the second control board is inserted may be the active control board slot or the standby control board slot in the communication device.

Taking that the second control board is inserted into the standby control board slot position as an example, in this case, the first control board at the active control board slot position is actually the active control board, and the second control board at the standby control board slot position is equivalent to a standby control board. According to a working mechanism of control boards in the shelf, after being inserted into the standby control board slot position and being powered on, run and started, the second control board detects that there is a control board at the active control board slot position being run, namely, the original active old control board, that is, the first control board, and the second control board sends the type information of the second control board to the first control board, and the type information of the second control board is type information of the second control board itself, such as hardware type information of the second control board.

102: Determine whether the type information of the second control board and type information of the first control board are the same; and when determining that the type information of the second control board and the type information of the first control board are different, the first control board sends configuration data stored by the first control board itself to the second control board, so that the second control board utilizes the configuration data to perform a configuration.

After the second control board sends its own control board type information to the first control board located in the same communication device, the first control board compares the received type information of the second control board with the type information of the first control board, such as compares the hardware type information of the second control board with that of the first control board to determine whether the hardware type information of the second control board and that of the first control board are the same, and whether the second control board and the first control board are control boards of a same type.

If after the comparison is undergone, the first control board finds that the type information of the second control board and the type information of the first control board are different, the first control board sends the configuration data stored by the first control board itself to the second control board. The configuration data refers to data already statically stored in the first control board, and also data that needs to be synchronized between the new control board and the old control board when hardware upgrading and replacement of a control board is performed.

After receiving the configuration data, the second control board utilizes the configuration data to perform the configuration, thereby implementing data import of the configuration data from the first control board to the second control board, and the second control board has a capability of continuing to be run to undertake service processing in the communication device. After the first control board is unplugged, the second control board may replace the first control board to continue to undertake a service, thereby implementing replacement of the first control board with the second control board.

It should be noted that, in this embodiment, when determining that the type information of the first control board and the type information of the second control board are different, the first control board sends static configuration data to the second control board; namely, the first control board may determine, according to that types of the control boards are different, that the second control board is a new control board, because types of a new control board and an old control board are generally different when control board hardware replacement is performed, for example, hardware type information of a control board is altered, the old control board sends, to the new control board, data that needs to be synchronized to the new control board during control board hardware upgrading and replacement accordingly, and this part of data is the static configuration data. Generally, for two control boards: an active one and a standby one, belonging to a same type in a shelf of a same communication device, the active control board also synchronizes data to the standby control board, but the data synchronized in this case includes static configuration data and dynamic configuration data, namely, data synchronization between the active control board and the standby control board and data synchronization during control board hardware replacement differ in types of the synchronized data.

In the data migration method of a control board in this embodiment, a second control board and a first control board are located in a same communication device to transmit configuration data, it is not required to additionally prepare a shelf and configuration data in a lab, and data configuration is automatically performed, thereby improving control board replacement efficiency, and reducing a manpower cost; furthermore, the new control board may be directly taken to a site of an existing network and be inserted with the old control board in a mixed manner, so during the time when an operator hurries to the site of the existing network, it is not required to stop service provisioning, thereby reducing the time during which a service is influenced; and furthermore, it is no longer required to put a tag on the new control board, and it is not required to seek the corresponding device according to the tag, which reduce an error ratio of a replacement procedure.

Embodiment 2

Figure 2:
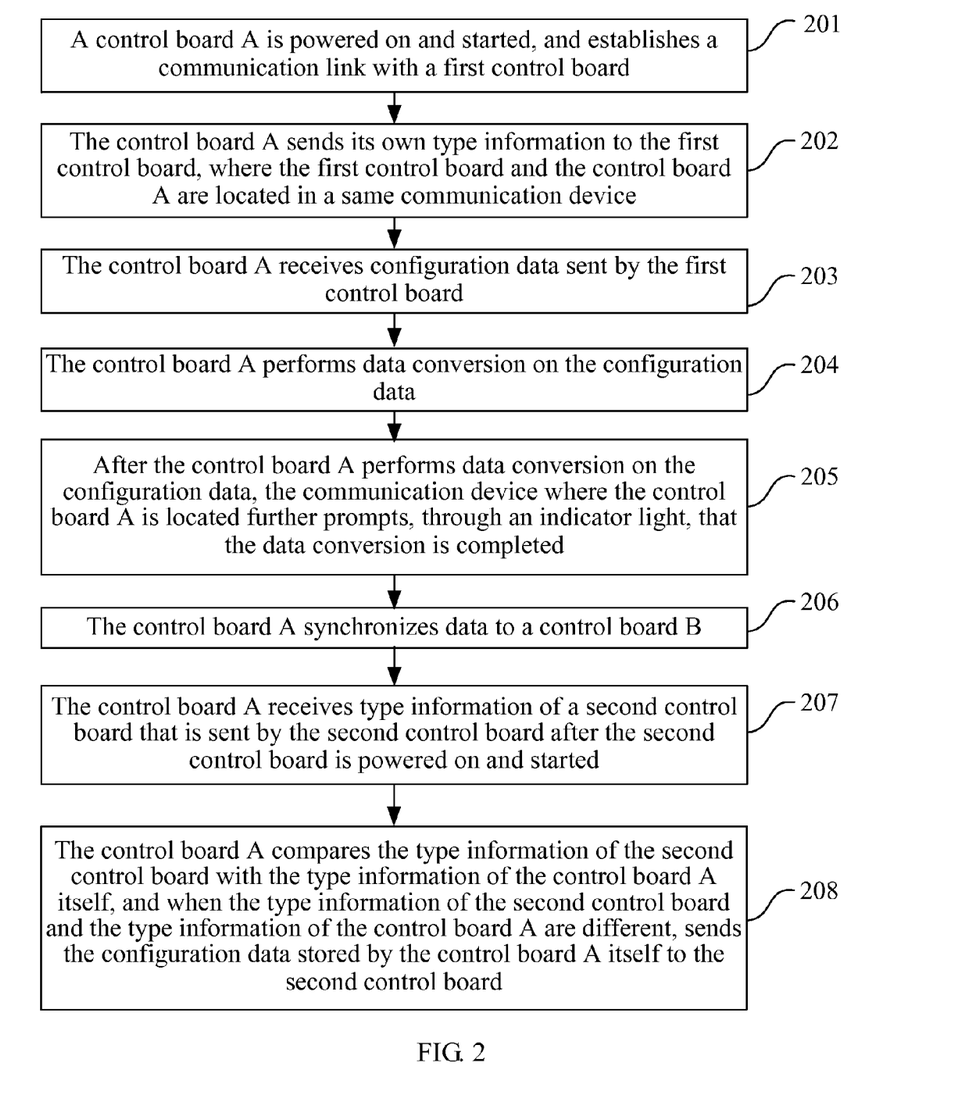
FIG. 2 is a schematic flow chart of another embodiment of a data migration method of a control board in a communication device according to the present invention.

FIG. 2 is a schematic flow chart of another embodiment of a data migration method of a control board in a communication device according to the present invention. An execution subject of this embodiment is, for example, a control board A, and what is described in this embodiment is that the control board A is a new control board at the beginning, and replaces an old control board (namely, a first control board) in a shelf; and then, after the control board A is run for a period of time, a new control board (namely, a second control board) with a capability higher than that of the control board A is developed, the second control board replaces the control board A, the control board A becomes an old control board relative to the second control board in this case, and a data configuration in the control board replacement procedure is illustrated. As shown in FIG. 2, the method may include:

201: A control board A is powered on and started, and establishes a communication link with a first control board.

In this case, two control boards: an active one and a standby one, exist in a shelf of a communication device, are located at an active control board slot position and a standby control board slot position in the shelf respectively, and may be referred to as an active old control board and a standby old control board; the control board A is a newly developed new control board, has a service processing capability higher than those of the two old control boards: the active one and the standby one, and is different from the old control boards in type.

In this embodiment, the standby old control board at the standby control board slot position is unplugged, the control board A is inserted into the standby control board slot position, and is run with the active old control board in a mixed insertion manner; the control board A is powered on and started after being inserted into the slot position. Furthermore, the control board A sends a communication link establishment request to the first control board, and establishes a communication link with the first control board.

202: The control board A sends its own type information to the first control board, where the first control board and the control board A are located in a same communication device.

The first control board is the active old control board mentioned in 201, the first control board and the control board A are located in the same communication device, the control board A is at the standby control board slot position of the communication device, the first control board is at the active control board slot position, and the two control boards are inserted in a mixed manner.

After being powered on and started, the control board A sends the type information of the control board A itself to the first control board.

203: The control board A receives configuration data sent by the first control board.

After receiving the type information of the control board A in 202, the first control board compares the type information of the control board A with type information of the first control board itself, and if finding that the type information of the control board A and the type information of the first control board are different, such as hardware type information of the control boards is different, the first control board sends the configuration data stored in the first control board to the control board A.

Actually, the first control board as the old control board synchronizes its own data to the control board A as the new control board, so as to implement that the control board A can replace the old control board to continue to provide a service processing function for the communication device, and to complete hardware upgrading of the new control board and the old control board.

204: The control board A performs data conversion on the configuration data.

The control board A performs data conversion on the data after receiving the configuration data sent by the first control board. When being stored on the first control board, the data is stored in a data format matching with a control board type corresponding to the first control board, so after current data is synchronized to the control board A, the control board A converts the data format into a data format matching with the type information of the control board A itself, so that the configuration data matches with the control board A, and only in this way, subsequent normal work of the control board A can be ensured.

205: After the control board A performs data conversion on the configuration data, the communication device where the control board A is located further prompts, through an indicator light, that the data conversion is completed.

For example, the indicator light may be disposed on the control board A, and for convenience of prompting an operator to perform a next operation, after the data conversion performed on the configuration data is completed, the control board A may control the indicator light to display, so as to prompt that the data conversion is completed. Alternatively, during specific implementation, the indicator light may also be disposed at another place, for example, the indicator light is disposed at a certain position of the communication device, and after learning, through a certain manner, that the data conversion performed by the control board A is completed, the communication device may control the indicator light to display, so as to prompt that the conversion performed by the control board A is completed.

Therefore, after finding that the control board A already completes the data conversion, namely, completes all work of the data configuration, the operator performs the next operation. For example, the operator unplugs the first control board, namely, unplugs, from the active control board slot position, the original active old control board sending the configuration data to the control board A, and inserts another new control board, such as a control board B, into the active control board slot position. Both the control board B and the control board A are new control boards, but because the control board A first completes the data configuration, the control board A is used as an active new control board, and the control board B is used as a standby new control board.

206: The control board A synchronizes data to the control board B.

As described above, the control board A as the active new control board synchronizes the data to the control board B as the standby new control board, and duplicates all data on the control board A to the control board B. An active and standby data synchronization method frequently used in this field may be adopted in a specific synchronization procedure, and no more details are given.

Through the foregoing procedure, the control board A and the control board B complete replacement of the original two old control boards in the shelf, and complete hardware upgrading and replacement of the control boards; furthermore, in a subsequent running procedure, after the first control board is unplugged from the control board slot, the control board A use the configuration data to start, thereby taking over the communication device, the control board A is used as the active new control board, and the control board B is used as the standby new control board.

The control board A and the control board B may also become old control boards with product upgrading and replacement. For example, after the device is run for a long period of time, a control board that is more advanced than this type of control boards: the control board A and the control board B, is developed. In order to satisfy service demands, the newly developed control board needs to replace the control board A and the control board B, and is this case, the control board A and the control board B become old control boards, and the newly developed control board may be referred to as a second control board. In subsequent steps 207 and 208, how to replace the control board A and the control board B with the second control board is described, and a specific procedure is the same as a procedure and a principle in which the control board A and the control board B replace the old control board before, so only simple description is given.

207: The control board A receives type information of the second control board that is sent by the second control board after the second control board is powered on and started.

Replacement of the new control board and the old control board is implemented still by adopting the mixed insertion and running manner, and it is assumed that the original control board B is unplugged from the slot position, and the second control board is inserted into the slot position of the control board B, so that the second control board and the control board A are run in a mixed insertion manner. After being powered on and started, the second control board sends the type information of the second control board to the control board A.

It should be noted that, when the mixed insertion is performed, preferably, the standby old control board located at the standby slot position is unplugged, so that the new control board and the active old control board are inserted in a mixed manner, and because the active old control board is generally responsible for service processing, and the standby old control board is generally in a standby state, unplugging the standby old control board does not influence normal running of a service; if the active old control board is unplugged, although the standby old control board is also started very quickly to become a new active old control board, a tiny influence is still caused to the service.

208: The control board A compares the type information of the second control board with the type information of the control board A itself, and when the type information of the second control board and the type information of the control board A are different, sends the configuration data stored by the control board A itself to the second control board.

The control board A compares its own type information with the type information of the second control board, and if the type information of the control board A and the type information of the second control board are different, sends the configuration data stored by the control board A itself to the second control board, so that the second control board utilizes the configuration data to perform a configuration.

Likewise, subsequently, after the second control board completes configuring the configuration data, the control board A is unplugged by the operator from the shelf, another new control board is inserted, and data synchronization is performed between the second control board and the another new control board, so as to finally complete upgrading of two new control boards.

Embodiment 3

Figure 3:
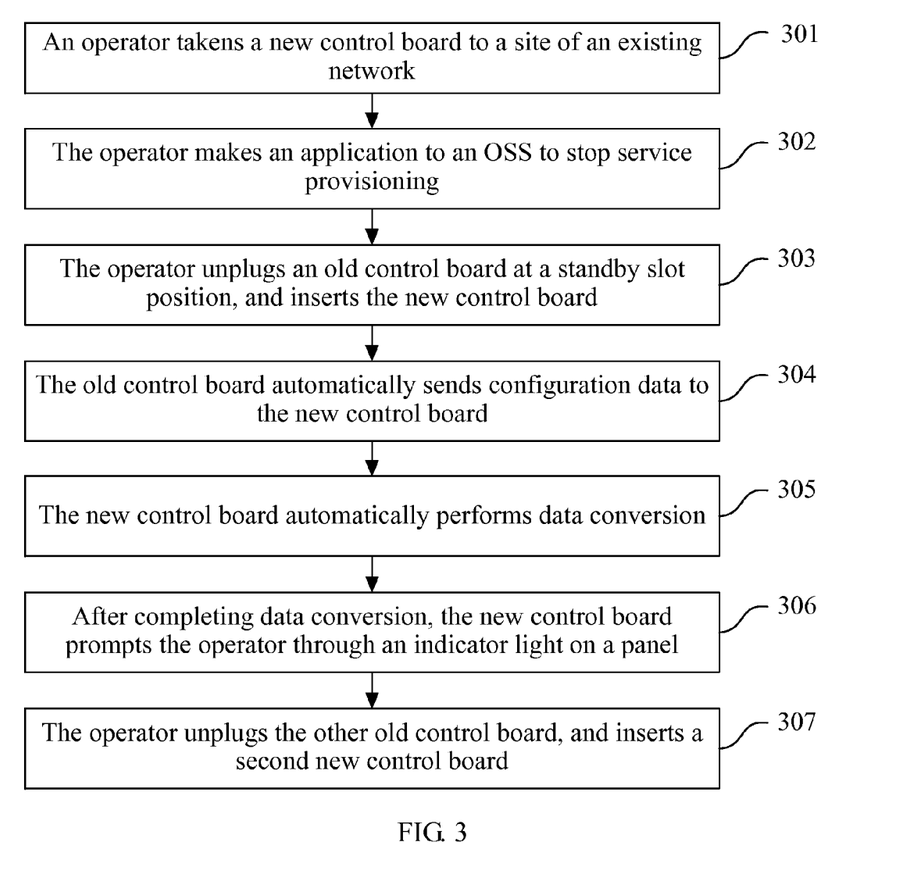
FIG. 3 is a schematic flow chart of still another embodiment of a data migration method of a control board according to the present invention.

FIG. 3 is a schematic flow chart of still another embodiment of a data migration method of a control board according to the present invention. In this embodiment, how an operator executes an upgrading and replacement procedure of a new control board and an old control board is mainly described, and because the control board in the embodiment of the present invention has the function described in the foregoing two embodiments, a procedure in which the operator performs hardware upgrading by using the control board in the embodiment of the present invention is also different from an existing hardware replacement procedure. As shown in FIG. 3, the method may include:

301: An operator takes a new control board to a site of an existing network.

After a hardware upgrading procedure begins, the operator neither needs to prepare an additional shelf to perform data import and conversion in a lab, nor needs to tag a site and a device on a control board, but directly takes the new control board to the site of the existing network.

302: The operator makes an application to an OSS to stop service provisioning.

After reaching the site, the operator makes a call to notify the OSS of stopping service provisioning, so as to avoid occurrence of data alteration in a control board replacement procedure to cause data inconsistency between the new control board and an old control board.

303: The operator unplugs the old control board at a standby slot position, and inserts the new control board.

After making the application to the OSS to stop service provisioning, the operator unplugs a standby old control board located at the standby control board slot position, and inserts the new control board, so that the new control board and an active old control board are run in a mixed insertion manner.

304: The old control board automatically sends configuration data to the new control board.

After being inserted into the standby control board slot position, the new control board is powered on and started, and sends type information of the new control board to the active old control board; when detecting that the type information of the new control board and type information of the active old main control board are different, the active old main control board automatically sends its own configuration data to the new control board.

305: The new control board automatically performs data conversion.

After receiving the configuration data sent by the old control board, the new control board automatically completes parsing and data conversion of the configuration data, and this procedure does not need manual intervention.

306: After completing data conversion, the new control board prompts the operator through an indicator light on a panel.

After completing data conversion, the new control board controls the indicator light on the panel of the new control board to display, so as to notify the operator of performing a next operation.

307: The operator unplugs the other old control board, and inserts a second new control board.

After seeing the display of the indicator light, the operator learns that the new control board already completes data conversion, unplugs the active old control board, and inserts another new control board at an active control board slot position; the new control board already completing data conversion automatically duplicates newly generated configuration data to the another new control board. So far, the entire control board replacement procedure is completed, and the operator may notify the OSS of restoring service provisioning.

The entire control board replacement procedure is extremely simple for the operator, and only three actions: board unplugging, board insertion and indicator light observation need to be executed, and may be completed without any professional, thereby greatly reducing an operation and maintenance cost.

In the data migration method of a control board in this embodiment, upgrading and replacement between different types of control boards are completed in a mixed insertion manner, a replacement operation may be performed by directly taking a new control board to a site of an existing network, and configuration data import and conversion of the new control board and an old control board are automatically completed without manual intervention, thereby greatly reducing a workload of an operator and complexity; furthermore, possibility of erroneous insertion of a control board does not need to be considered, the replacement operation may be completed by randomly inserting the new control board into a device that needs to be upgraded, and replacement of a plurality of sites may be simultaneously performed; the time during which service provisioning is interrupted is also shortened to a large extent, service provisioning is not stopped until the operator reaches the site and prepares to unplug the board to perform the replacement operation, which avoid a malpractice in a conventional solution that service provisioning is stopped during data preparation, and the time during which service provisioning is interrupted is reduced from several hours or even about a dozen of hours in the conventional solution to several minutes or dozens of minutes, thereby greatly reducing an impact on a service of the existing network.

Embodiment 4

Figure 4:
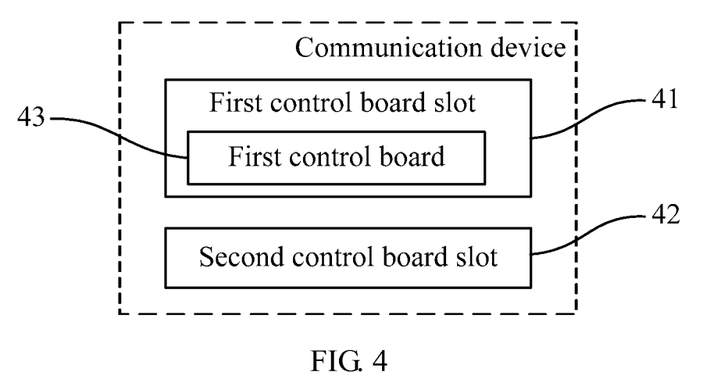
FIG. 4 is a schematic structural diagram of an embodiment of a communication device according to the present invention.

FIG. 4 is a schematic structural diagram of an embodiment of a communication device according to the present invention. As shown in FIG. 4, the communication device includes a first control board slot 41 and a second control board slot 42, and the first control board slot 41 is inserted with a first control board 43.

The first control board 43 is configured to, after a second control board is inserted into the second control board slot, receive type information from the second control board, and determine whether the type information of the second control board and type information of the first control board are the same; and when determining that the type information of the second control board and the type information of the first control board are different, send configuration data stored by the first control board itself to the second control board, so that the second control board utilizes the configuration data to perform a configuration.

Figure 5:
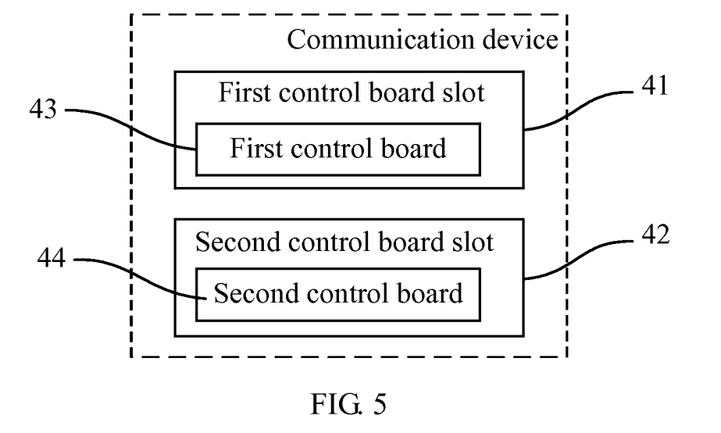
FIG. 5 is a schematic structural diagram of another embodiment of a communication device according to the present invention.

FIG. 5 is a schematic structural diagram of another embodiment of a communication device according to the present invention. As shown in FIG. 5, on the basis of a structure in FIG. 4, the communication device further includes: a second control board 44, where the second control board 44 is inserted into the second control board slot 42; and the first control board 43 is further configured to, before receiving the type information from the second control board, receive a communication link establishment request sent by the second control board, and establish a communication link with the second control board according to the communication link establishment request.

Further, the second control board 44 is configured to, before utilizing the configuration data received from the first control board to perform the configuration, convert the configuration data, so that the configuration data matches with the second control board.

Further, the second control board 44 is further configured to, after the first control board is unplugged from the first control board slot, use the configuration data to start, thereby taking over the communication device.

Further, the second control board 44 is further configured to, when the first control board slot is inserted with a new control board, send configuration data stored by the second control board itself to the new control board.

Embodiment 5

Figure 6:
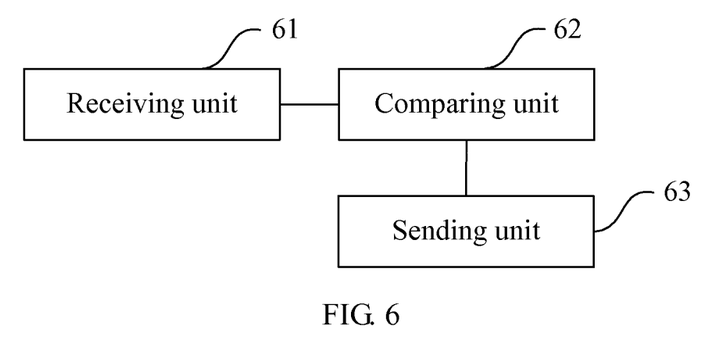
FIG. 6 is a schematic structural diagram of an embodiment of a control board according to the present invention.

FIG. 6 is a schematic structural diagram of an embodiment of a control board according to the present invention. The control board may execute the method of any embodiment of the present invention, the control board is configured to be inserted into a first control board slot of a communication device, and the communication device is further disposed with a second control board slot.

As shown in FIG. 6, the control board may include: a receiving unit 61, a comparing unit 62 and a sending unit 63, where the receiving unit 61 is configured to, after a second control board is inserted into the second control board slot, receive type information from the second control board; and the comparing unit 62 is configured to determine whether type information of the current control board and the type information of the second control board are the same; and when a determining result is that the type information of the current control board and the type information of the second control board are different, send, through the sending unit 63 to the second control board, configuration data stored by the current control board itself, so that the second control board utilizes the configuration data to perform a configuration.

For example, the comparing unit 42 may be a central processing unit (Central Processing Unit, CPU), or the like.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various media capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to part or all of the technical features of the technical solutions described in the foregoing embodiments; however, these modifications or replacements do not make the essence of the corresponding technical solutions depart from the scope of the technical solutions of the embodiments of the present invention.

What is claimed is:

1. A data migration method of a control board in a communication device, wherein the communication device comprises a first control board slot and a second control board slot, wherein the first control board slot holds a first control board, the method comprising:
   after a second control board is inserted into the second control board slot, receiving, by the first control board, type information from the second control board, and determining whether the type information of the second control board and type information of the first control board are the same; and
   when determining that the type information of the second control board and the type information of the first control board are different, sending, by the first control board, configuration data stored by the first control board to the second control board;
   converting, by the second control board, the configuration data, wherein the converted configuration data matches with the type information of the second control board;
   indicating, with an indicator light, that data conversion is completed; and
   utilizing, by the second control board, the configuration data to perform a configuration.

2. The method according to claim 1, wherein before the receiving, by the first control board, type information from the second control board, the method further comprises:
   receiving, by the first control board from the second control board, a communication link establishment request, and
   establishing a communication link with the second control board according to the communication link establishment request.

3. A communication device, comprising:
   a first control board slot;
   a first control board inserted into the first control board slot; and
   a second control board slot;
   wherein the first control board is configured to, after a second control board is inserted into the second control board slot, receive type information from the second control board, to determine whether the type information of the second control board and type information of the first control board are the same; and
   wherein the type information of the second control board and the type information of the first control board are different, the first control board is configured to send configuration data stored by the first control board to the second control board to cause the second control board to utilize the configuration data to perform a configuration;
   wherein the second control board is configured to be inserted into the second control board slot; and
   wherein the first control board is further configured to, before receiving the type information from the second control board, receive a communication link establishment request sent by the second control board and to establish a communication link with the second control board according to the communication link establishment request;
   wherein the second control board is further configured to use the configuration data to start and to take over the communication device after the first control board is unplugged from the first control board slot.

4. The communication device according to claim 3, wherein
   the second control board is configured to, before utilizing the configuration data received from the first control board to perform the configuration, convert the configuration data, wherein the converted configuration data matches with the second control board.

5. The communication device according to claim 3, wherein
   the second control board is further configured to, when a new control board is inserted into the first control board slot, send configuration data stored by the second control board to the new control board.

* * * * *